US006876618B2

(12) United States Patent
Tonami et al.

(10) Patent No.: US 6,876,618 B2
(45) Date of Patent: Apr. 5, 2005

(54) REPRODUCING APPARATUS

(75) Inventors: Junichiro Tonami, Yokohama (JP); Hideki Nakamura, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 507 days.

(21) Appl. No.: 10/114,260

(22) Filed: Apr. 3, 2002

(65) Prior Publication Data

US 2002/0154588 A1 Oct. 24, 2002

(30) Foreign Application Priority Data

| Apr. 20, 2001 | (JP) | ................................. 2001-122384 |
| Feb. 27, 2002 | (JP) | ................................. 2002-051071 |

(51) Int. Cl.$^7$ ................................................. G11B 5/76
(52) U.S. Cl. ................................. 369/59.21; 369/124.05
(58) Field of Search ........................... 369/47.18, 47.2, 369/47.23, 47.24, 47.35, 53.33, 53.34, 53.35, 59.17, 59.19, 59.2, 59.21, 59.22, 124.05, 124.07; 375/124.14, 232, 233

(56) References Cited

U.S. PATENT DOCUMENTS 5,787,118 A * 7/1998 Ueda ........................ 375/232
6,445,662 B1 * 9/2002 Tonami .................... 369/59.21

FOREIGN PATENT DOCUMENTS

| JP | 7-192270 | 7/1995 |
| JP | 10-106161 | 4/1998 |
| JP | 10-269701 | 10/1998 |
| JP | 2001-110146 | 4/2001 |

OTHER PUBLICATIONS

"A Study of Digital Auto Equalizer and PLL System Using Maximum Likelihood Error for Digital VCRs" by Tonami et al.; IEEE Transactions on Consumer Electronics, vol. .43, No. 3; Aug. 1997; pp., 934–944.

U.S. Appl. No. 09/468,130 (corres. to JP 2001–110146).

* cited by examiner

Primary Examiner—Paul W. Huber
(74) Attorney, Agent, or Firm—Louis Woo

(57) ABSTRACT

A signal is reproduced from a recording medium. The reproduced signal is sampled in response to a clock signal to get a sampling-resultant signal. A transversal filter includes a delay line having taps and delaying the sampling-resultant signal, multipliers for multiplying only alternate ones among signals appearing at the taps by tap coefficients to get multiplication results, and an adder for adding the multiplication results into a filtering-resultant signal. A temporary decision device operates for calculating a temporary decision value of the filtering-resultant signal according to a temporary decision procedure, for calculating a difference between the temporary decision value of the filtering-resultant signal and an actual value thereof, and for generating an error signal in response to the calculated difference. The tap coefficients used in the transversal filter are controlled in response to the error signal and the reproduced signal to minimize the error signal.

7 Claims, 9 Drawing Sheets

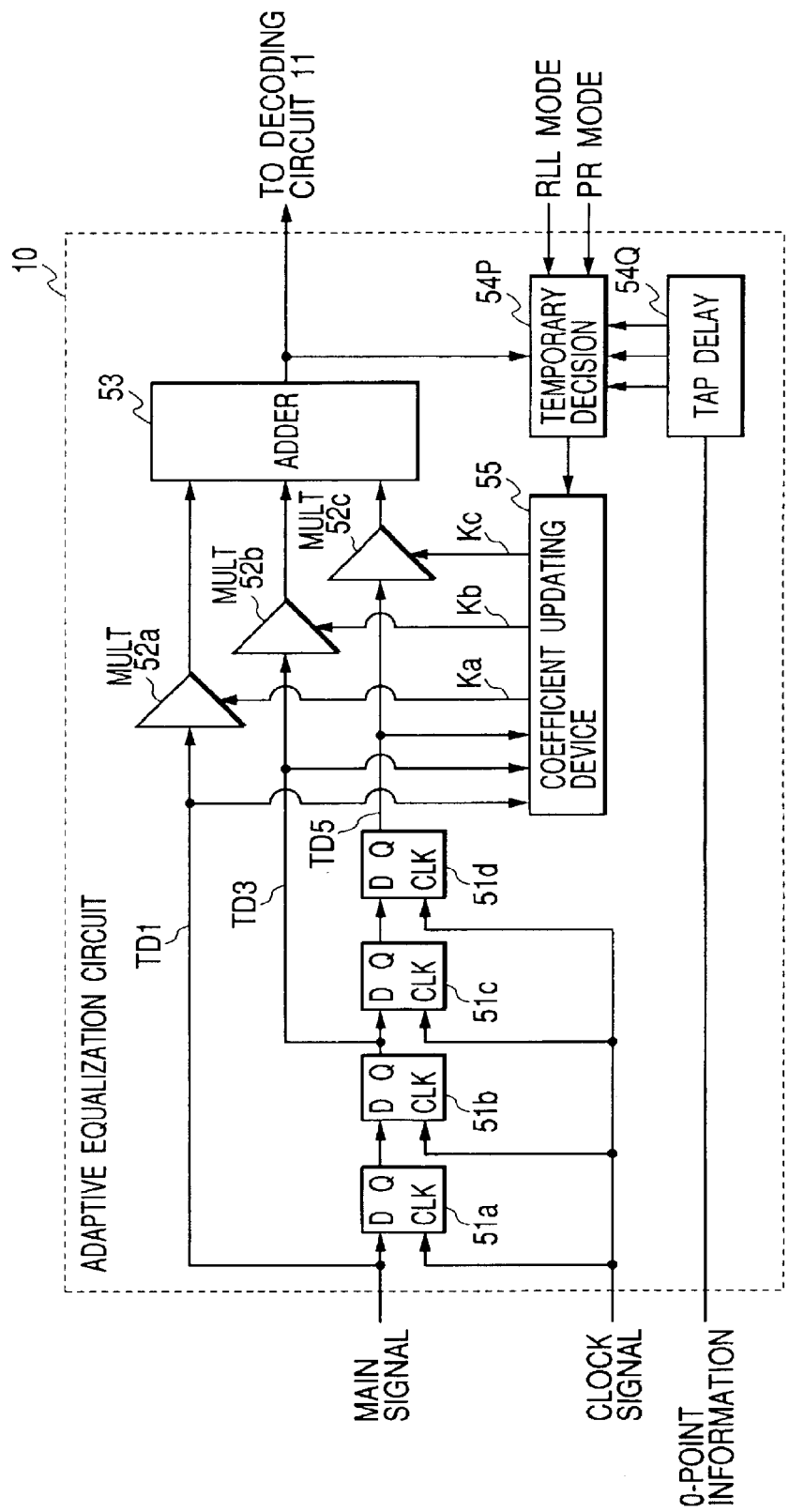

REPRODUCING APPARATUS

BACKGROUND OF THE INVENTION

1. Field of the Invention

This invention generally relates to an apparatus for reproducing information from a recording medium. This invention specifically relates to an information reproducing apparatus including a waveform equalization circuit for processing a signal reproduced from a recording medium such as an optical disc.

2. Description of the Related Art

Japanese patent application publication number 10-106161/1998 discloses an optical information reproducing apparatus based on a PRML (partial response maximum likelihood) system. In the apparatus of Japanese patent application 10-106161, information of a run-length-limited code is reproduced from an optical disc through a reproducing section, and a transversal filter subjects the reproduced waveform to partial-response equalization. The output signal of the transversal filter is decoded into binary data by a maximum-likelihood decoder. The apparatus of Japanese patent application 10-106161 includes a parameter setting device which selects intersymbol-interference imparting values in the partial-response equalization in accordance with the characteristics of the reproduced waveform. Also, the parameter setting device sets tap coefficients of the transversal filter and a decision point signal level for the maximum-likelihood decoder as parameters in response to the selected intersymbol-interference imparting values.

The apparatus of Japanese patent application 10-106161 premises that the optical disc has predetermined pits (reference pits) representative of parameter-setting reference data.

Accordingly, the apparatus of Japanese patent application 10-106161 fails to implement suitable waveform equalization for an optical disc which lacks such predetermined pits.

Japanese patent application publication number 7-192270/1995 discloses an apparatus for reproducing a digital signal of a run-length-limited code from an optical disc. The apparatus of Japanese patent application 7-192270 uses a method suited for a high information recording density. The method in Japanese patent application 7-192270 performs ternary equalization whose objects are only an amplitude except for points corresponding to a data train provided with a minimum code inverting gap among points just before or just after the inverting position of a code and an amplitude at the inverting position of the code.

In the apparatus of Japanese patent application 7-192270, a signal is read from an optical disc by an optical head, and the read signal is applied through an amplifier to an equalizer. A decider following the equalizer discriminates the level of the output signal of the equalizer. The decider includes two comparators. The output signals of the comparators are fed to an error calculation circuit as level discrimination results. Since the decider includes the two comparators, the signal processing by the decider and also an error calculation process are relatively complicated.

SUMMARY OF THE INVENTION

It is an object of this invention to provide an improved reproducing apparatus.

A first aspect of this invention provides a reproducing apparatus comprising means for reproducing a signal from a recording medium to get a reproduced signal; means for sampling the reproduced signal in response to a clock signal to get a sampling-resultant signal; a transversal filter including a delay line having taps and delaying the sampling-resultant signal, multipliers for multiplying only alternate ones among signals appearing at the taps by tap coefficients to get multiplication results, and an adder for adding the multiplication results into a filtering-resultant signal; a temporary decision device for calculating a temporary decision value of the filtering-resultant signal according to a temporary decision procedure, for calculating a difference between the temporary decision value of the filtering-resultant signal and an actual value thereof, and for generating an error signal in response to the calculated difference; and means for controlling the tap coefficients used in the transversal filter in response to the error signal and the reproduced signal to minimize the error signal.

A second aspect of this invention provides a reproducing apparatus comprising means for reproducing a signal of a run-length-limited code from a recording medium to get a reproduced signal; means for sampling the reproduced signal in response to a clock signal to get a sampling-resultant signal; a transversal filter including a delay line having taps and delaying the sampling-resultant signal, multipliers for multiplying signals appearing at the taps by tap coefficients to get multiplication results, and an adder for adding the multiplication results into a filtering-resultant signal; a temporary decision device for calculating a temporary decision value of the filtering-resultant signal according to a temporary decision procedure, for calculating a difference between the temporary decision value of the filtering-resultant signal and an actual value thereof, and for generating an error signal in response to the calculated difference; means for controlling the tap coefficients used in the transversal filter in response to the error signal and the reproduced signal to minimize the error signal; and means for controlling first ones among the tap coefficients in response to second one among the tap coefficients, the second one differing from the first ones.

A third aspect of this invention is based on the first aspect thereof, and provides a reproducing apparatus further comprising means for detecting whether or not the sampling-resultant signal corresponds to a zero-cross point, and generating 0-point information in response to a result of said detecting; a delay circuit responsive to the 0-point information for outputting temporally spaced samples of the 0-point information; and means provided in the temporary decision device for calculating the temporary decision value of the filtering-resultant signal on the basis of a PR mode signal, an RLL mode signal, the samples of the 0-point information which are outputted from the delay circuit, and an actual value of the filtering-resultant signal, the PR mode signal representing a type of a partial-response waveform equalization corresponding to filtering by the transversal filter, the RLL mode signal representing a type of the run-length-limited code used by the reproduced signal.

A fourth aspect of this invention is based on the second aspect thereof, and provides a reproducing apparatus further comprising means for detecting whether or not the sampling-resultant signal corresponds to a zero-cross point, and generating 0-point information in response to a result of said detecting; a delay circuit responsive to the 0-point information for outputting temporally spaced samples of the 0-point information; and means provided in the temporary decision device for calculating the temporary decision value of the filtering-resultant signal on the basis of a PR mode signal, an RLL mode signal, the samples of the 0-point information which are outputted from the delay circuit, and an actual value of the filtering-resultant signal, the PR mode signal representing a type of a partial-response waveform equalization corresponding to filtering by the transversal filter, the RLL mode signal representing a type of a run-length-limited code used by the reproduced signal.

A fifth aspect of this invention is based on the third aspect thereof, and provides a reproducing apparatus wherein the 0-point-information generating means comprises a re-sampling DPLL circuit for re-sampling the sampling-resultant signal to get a re-sampling-resultant signal, for detecting whether or not the re-sampling-resultant signal corresponds to a zero-cross point, and for generating the 0-point information in response to a result of said detecting.

A sixth aspect of this invention provides a reproducing apparatus comprising means for reproducing a signal from a recording medium to get a reproduced signal; means for sampling the reproduced signal in response to a clock signal to get a sampling-resultant signal; means for re-sampling the sampling-resultant signal on an interpolation basis to get a re-sampling-resultant signal; means for separating one of (1) the sampling-resultant signal and (2) the re-sampling-resultant signal into an odd-sample signal composed of odd-numbered signal samples and an even-sample signal composed of even-numbered signal samples; a first transversal filter including a first delay line having first taps and delaying the odd-sample signal, first multipliers for multiplying first tap signals appearing at the first taps by first tap coefficients to get first multiplication results, and a first adder for adding the first multiplication results into a first filtering-resultant signal; a first temporary decision device for calculating a temporary decision value of the first filtering-resultant signal according to a temporary decision procedure, for calculating a first difference between the temporary decision value of the first filtering-resultant signal and an actual value thereof, and for generating a first error signal in response to the calculated first difference; means for controlling the first tap coefficients in response to the first error signal and the first tap signals to minimize the first error signal; means for controlling first ones among the first tap coefficients in response to second one among the first tap coefficients, the second one differing from the first ones; a second transversal filter including a second delay line having second taps and delaying the even-sample signal, second multipliers for multiplying second tap signals appearing at the second taps by second tap coefficients to get second multiplication results, and a second adder for adding the second multiplication results into a second filtering-resultant signal;

a second temporary decision device for calculating a temporary decision value of the second filtering-resultant signal according to the temporary decision procedure, for calculating a second difference between the temporary decision value of the second filtering-resultant signal and an actual value thereof, and for generating a second error signal in response to the calculated second difference; means for controlling the second tap coefficients in response to the second error signal and the second tap signals to minimize the second error signal; means for controlling third ones among the second tap coefficients in response to fourth one among the second tap coefficients, the fourth one differing from the third ones; and means for combining the first filtering-resultant signal and the second filtering-resultant signal into a final filtering2 resultant signal.

A seventh aspect of this invention provides a reproducing apparatus comprising means for reproducing a signal from a recording disc to get a reproduced signal; means for sampling the reproduced signal in response to a clock signal to get a sampling2 resultant signal; a transversal filter including a delay line having taps and delaying the sampling-resultant signal, multipliers for multiplying tap signals appearing at the taps by tap coefficients to get multiplication results, and an adder for adding the multiplication results into a filtering-resultant signal; a temporary decision device for calculating a temporary decision value of the filtering-resultant signal according to a temporary decision procedure, for calculating a difference between the temporary decision value of the filtering-resultant signal and an actual value thereof, and for generating an error signal in response to the calculated difference; means for controlling the tap coefficients used in the transversal filter in response to the error signal and the tap signals to minimize the error signal; and means for controlling first ones among the tap coefficients in response to second one among the tap coefficients, the second one differing from the first ones.

BRIEF DESCRIPTION OF THE DRAWINGS

FIG. 11 is a block diagram of an adaptive equalization circuit in FIG. 9.

DETAILED DESCRIPTION OF THE INVENTION

A background-art reproducing apparatus will be explained below for a better understanding of this invention. In the background-art reproducing apparatus, when the frequency band of a reproduced signal is narrow with respect to the channel rate (bit rate) thereof, high-frequency signal components are insufficient so that an equalization result of the reproduced signal can not converge on correct points.

Figure 1:
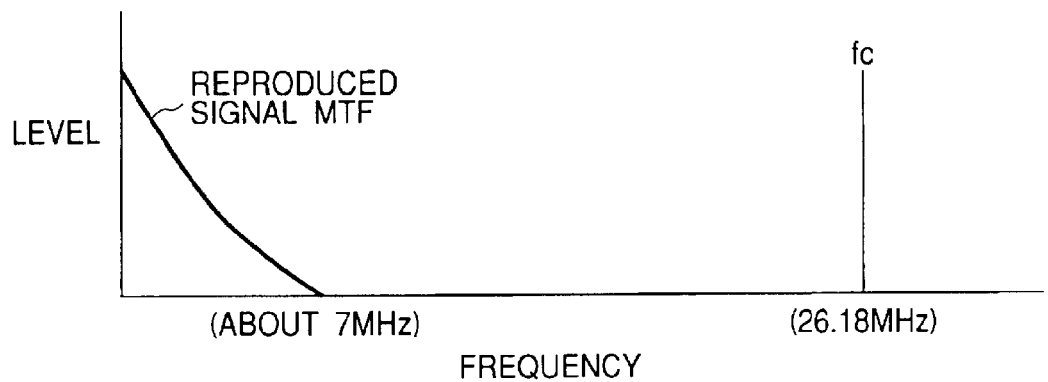
FIG. 1 is a frequency-domain diagram of a reproduced signal and a channel rate.

The background-art reproducing apparatus includes an optical system for reproducing a signal from a DVD (digital versatile disc). As shown in FIG. 1, with respect to the channel rate "fc" of the reproduced signal, high-frequency components are considerably attenuated or deleted from the reproduced signal according to the modulation transfer function (MTF) of the optical system.

The background-art reproducing apparatus includes a filter for subjecting the reproduced signal to equalization.

Figure 2:
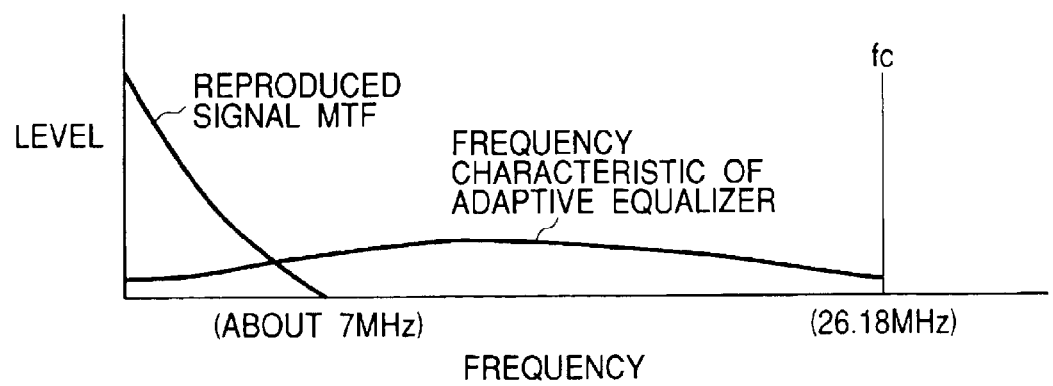
FIG. 2 is a frequency-domain diagram of a reproduced signal, a channel rate, and a frequency characteristic of an equalizer in a background-art reproducing apparatus.

The filter acts as an adaptive equalizer. The filter has taps spaced at 1-bit intervals. The equalization is implemented by using signals at all the taps. The filter (equalizer) has a frequency characteristic as shown in FIG. 2.

As shown in FIG. 1, components of the reproduced signal which have frequencies near half the channel rate "fc" are completely lost or attenuated to lower than a noise level. The filter (equalizer) can not recover such high-frequency signal components. In the absence of these high-frequency signal components, filter tap coefficients tend to converge on wrong points at which the waveform of an equalization result of the reproduced signal is close to target one while the Nyquist conditions are satisfied. In the case where a small amount of these high-frequency signal components remains, when the filter excessively emphasizes them, the filter tap coefficients tend to converge on wrong points.

First Embodiment

Figure 3:
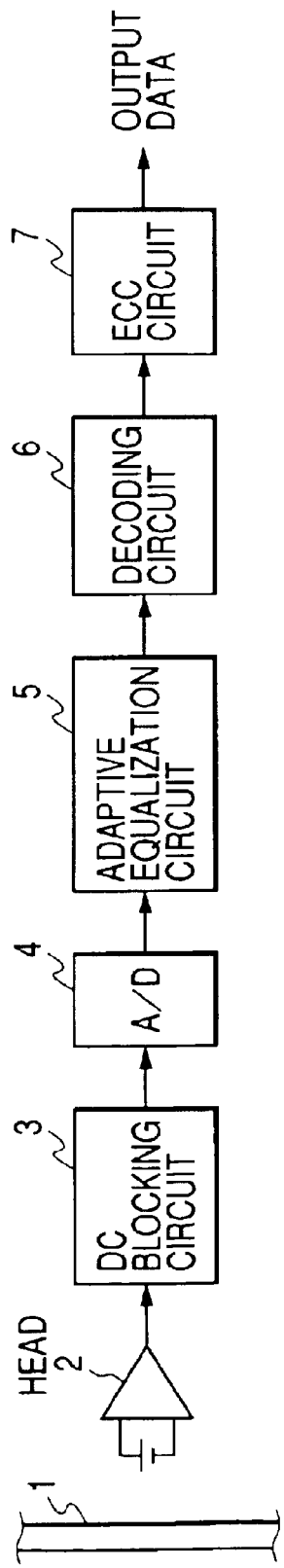
FIG. 3 is a block diagram of an information reproducing apparatus according to a first embodiment of this invention.

FIG. 3 shows an information reproducing apparatus according to a first embodiment of this invention. With reference to FIG. 3, an optical disc 1 stores a signal of a run-length-limited code at a predetermined high recording density. An optical head 2 reads out the signal of the run-length-limited code from the optical disc 1. The optical head 2 includes a photoelectric converter (a photodetector), and an amplifier following the photoelectric converter. The optical head 2 outputs the read-out signal to a direct-current blocking circuit (a DC blocking circuit) 3.

The circuit 3 blocks a direct-current component (a DC component) of the read-out signal, and passes only alternating5 current components (AC components) thereof. The output signal of the DC blocking circuit 3 is applied to an A/D (analog-to-digital) converter 4. The A/D converter 4 changes the output signal of the DC blocking circuit 3 into a corresponding digital signal.

Specifically, the A/D converter 4 receives a clock signal from a suitable circuit such as a PLL (phase locked loop) circuit. The clock signal may be a system clock signal or a bit clock signal. The A/D converter 4 periodically samples the output signal of the DC blocking circuit 3 in response to the clock signal, and converts every resultant sample into a digital sample. The A/D converter 4 outputs the digital signal, that is, a sequence of the digital samples, to an adaptive equalization circuit 5.

A digital AGC (automatic gain control) circuit may be provided between the A/D converter 4 and the adaptive equalization circuit 5. In this case, the AGC circuit subjects the output signal of the A/D converter 4 to automatic gain control for providing a constant signal amplitude on a digital basis. The AGC circuit outputs the resultant digital signal to the adaptive equalization circuit 5.

The adaptive equalization circuit 5 subjects the output signal of the A/D converter 4 (or the output signal of the AGC circuit) to automatic waveform equalization which corresponds to a process of providing the signal in question with a partial-response (PR) characteristic. The adaptive equalization circuit 5 outputs the equalization-resultant signal to a decoding circuit 6. The decoding circuit 6 recovers original data from the output signal of the adaptive equalization circuit 5 through a viterbi decoding procedure. The decoding circuit 6 outputs the recovered data to an ECC (error checking and correcting) circuit 7. The ECC circuit 7 extracts an error correction code from the recovered data outputted by the decoding circuit 6. The ECC circuit 7 corrects errors in the recovered data in response to the error correction code. The ECC circuit 7 outputs the resultant recovered data.

The decoding circuit 6 is of a known structure. An example of the decoding circuit 6 is designed as follows. The decoding circuit includes a memory loaded with a plurality of candidate recovered data pieces. Also, the decoding circuit 6 includes a section for calculating branch metric values from samples of the output signal of the adaptive equalization circuit 5. Furthermore, the decoding circuit 6 includes a section for accumulating the branch metric values into path metric values respectively. The path metric values relate to the candidate recovered data pieces respectively. In addition, the decoding circuit 6 includes a section for detecting the minimum value among the path metric values, and generating a selection signal corresponding to the detected minimum path metric value. The selection signal is applied to the memory. One of the candidate recovered data pieces which corresponds to the minimum path metric value is elected in response to the selection signal, being outputted from the memory as the recovered data.

It should be noted that the optical disc 1 may be replaced by a magneto-optical (MO) disc, a hard disc (HD), another magnetic recording disc, or a recording card.

Figure 4:
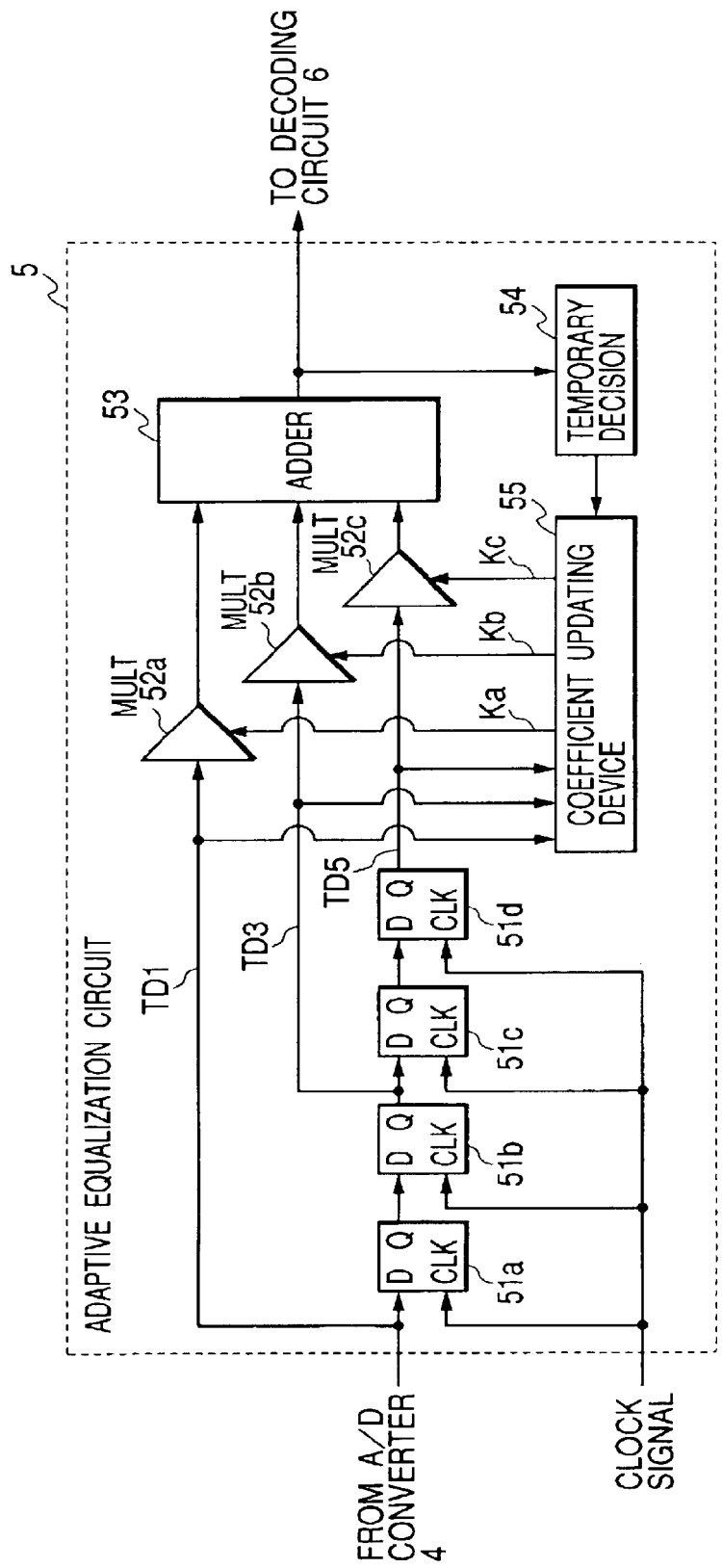
FIG. 4 is a block diagram of an adaptive equalization circuit in FIG. 3.

As shown in FIG. 4, the adaptive equalization circuit 5 includes D-type flip-flop circuits (D-FFs) $51a$, $51b$, $51c$, and $51d$, multipliers $52a$, $52b$, and $52c$, an adder 53, a temporary decision device (a provisional determination device) 54, and a coefficient updating device 55. The D-FFs $51a$, $51b$, $51c$, and $51d$, the multipliers $52a$, $52b$, and $52c$, and the adder 53 are connected to form a transversal filter. Specifically, the D-FFs $51a$, $51b$, $51c$, and $51d$ are connected in cascade or series in that order to compose a multiple-tap delay line in the transversal filter. The input terminal of the D-FF $51a$ is subjected to the output signal of the A/D converter 4. The clock terminals of the D-FFs $51a$, $51b$, $51c$, and $51d$ receive a system clock signal (a bit clock signal) from a suitable device. The D-FFs $51a$, $51b$, $51c$, and $51d$ are driven by the system clock signal. The output signal of the A/D converter 4 propagates successively through the D-FFs $51a$, $51b$, $51c$, and $51d$ while being delayed thereby.

Each of the D-FFs $51a$, $51b$, $51c$, and $51d$ provides a predetermined signal delay corresponding to a period of the system clock signal, that is, a 1-sample interval or a 1-bit-corresponding interval. The output signal of the A/D converter 4 which is applied to the input terminal of the D-FF $51a$ is used as a tap output signal TD1. Thus, the tap output signal TD is a non-delayed signal. A signal which appears at the tap (junction) between the D-FFs $51b$ and $51c$ is used as a tap output signal TD3. The tap output signal TD3 is delayed from the tap output signal TD1 by a 2-sample interval or a 2-bit-corresponding interval. A signal which appears at the output terminal of the D-FF $51d$ is used as a tap output signal TD5. The tap output signal TD5 is delayed from the tap output signal TD3 by a 2-sample interval or a 2-bit-corresponding interval.

The tap output signal TD1 is fed to the multiplier $52a$ and the coefficient updating device 55. The tap output signal TD3 is fed to the multiplier $52b$ and the coefficient updating device 55. The tap output signal TD5 is fed to the multiplier $52c$ and the coefficient updating device 55. The multiplier $52a$ receives an output signal of the coefficient updating device 55 which represents a tap coefficient Ka. The multiplier $52b$ receives an output signal of the coefficient updating device 55 which represents a tap coefficient Kb. The multiplier $52c$ receives an output signal of the coefficient updating device 55 which represents a tap coefficient Kc. The tap coefficients Ka, Kb, and Kc correspond to waveform equalization coefficients. The device $52a$ multiplies the tap output signal TD11 and the tap coefficient Ka, and outputs the multiplication-resultant signal to the adder 53. The device 52b multiplies the tap output signal TD3 and the tap coefficient Kb, and outputs the multiplication-resultant signal to the adder 53. The device 52c multiplies the tap output signal TD5 and the tap coefficient Kc, and outputs the multiplication-resultant signal to the adder 53. The device 53 adds up the output signals of the multipliers 52a, 52b, and 52c into the equalization-resultant signal. The adder 53 outputs the equalization-resultant signal to the decoding circuit 6. In addition, the adder 53 outputs the equalization-resultant signal to the temporary decision device 54.

The temporary decision device 54 includes a logic circuit which is designed to implement a temporary decision about the equalization-resultant signal (the output signal of the adder 53) according to a predetermined algorithm. The temporary decision device 54 may include a programmable signal processor. In this case, the predetermined algorithm is given as a program for controlling the signal processor. The temporary decision device 54 generates a target signal value for the equalization-resultant signal in accordance with the result of the temporary decision. The temporary decision device 54 includes a subtracter which calculates the difference (error) between the target signal value and the actual value of the equalization-resultant signal. The subtracter outputs a signal representative of the calculated difference to the coefficient updating device 55 as an equalization error signal (an amplitude error signal). The temporary decision device 54 may be of a known structure.

The coefficient updating device 55 generates a tap coefficient Ka in response to the tap output signal TD1 and the equalization error signal. The coefficient updating device 55 outputs a signal representative of the generated tap coefficient Ka to the multiplier 52a. The coefficient updating device 55 generates a tap coefficient Kb in response to the tap output signal TD3 and the equalization error signal. The coefficient updating device 55 outputs a signal representative of the generated tap coefficient Kb to the multiplier 52b. The coefficient updating device 55 generates a tap coefficient Kc in response to the tap output signal TD5 and the equalization error signal. The coefficient updating device 55 outputs a signal representative of the generated tap coefficient Kc to the multiplier 52c. The generated tap coefficients Ka, Kb, and Kc are updated on a sample-by-sample basis or a bit-by-bit basis. Preferably, the updating of the tap coefficients Ka, Kb, and Kc in response to the equalization error signal is based on a feedback LMS (least-mean-square) adaptive algorithm designed to minimize the equalization error signal.

Figure 5:
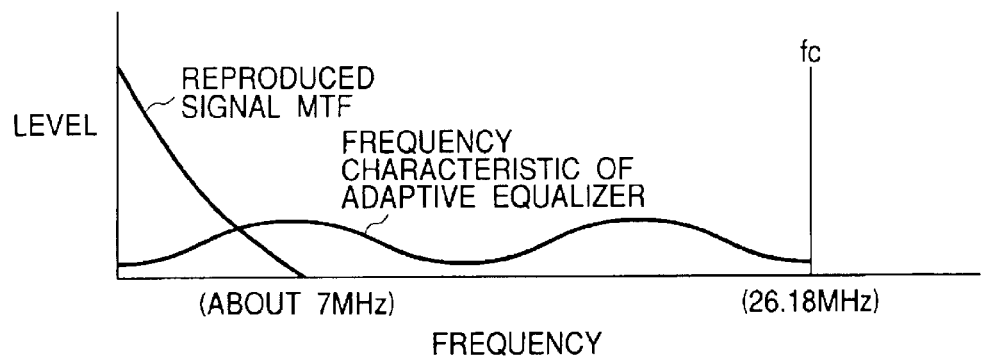
FIG. 5 is a frequency-domain diagram of a reproduced signal, a channel rate, and a frequency characteristic of the adaptive equalization circuit in FIGS. 3 and 4.

The adaptive equalization circuit 5 does not use a signal appearing at the tap (junction) between the D-FFs 51a and 51b, and a signal appearing at the tap between the D-FFs 51c and 51d. In other words, the adaptive equalization circuit 5 uses only alternate ones of the tap output signals from the transversal filter. Specifically, as shown in FIG. 4, only the signal applied to the input terminal of the D-FF 51a, the signal appearing at the tap between the D-FFs 51b and 51c, and the signal appearing at the output terminal of the D-FF 51d are used. The signal applied to the input terminal of the D-FF 51a, the signal appearing at the tap between the D-FFs 51b and 51c, and the signal appearing at the output terminal of the D-FF 51d are temporally spaced at 2-sample intervals (2-bit-corresponding intervals). Accordingly, using only alternate ones of the tap output signals from the transversal filter is equivalent to halving the sampling frequency. The adaptive equalization circuit 5 has a frequency characteristic as shown in FIG. 5. The entire filtering characteristic of the adaptive equalization circuit 5 is determined by only a portion thereof which corresponds to a frequency range equal to or below a half of the channel rate "fc".

In this case, the filter tap coefficients are prevented from converging on wrong points while the Nyquist conditions are satisfied.

The coefficient updating device 55 handles only the three tap coefficients Ka, Kb, and Kc. Therefore, the coefficient updating device 55 is relatively small in circuit scale.

Figure 6:
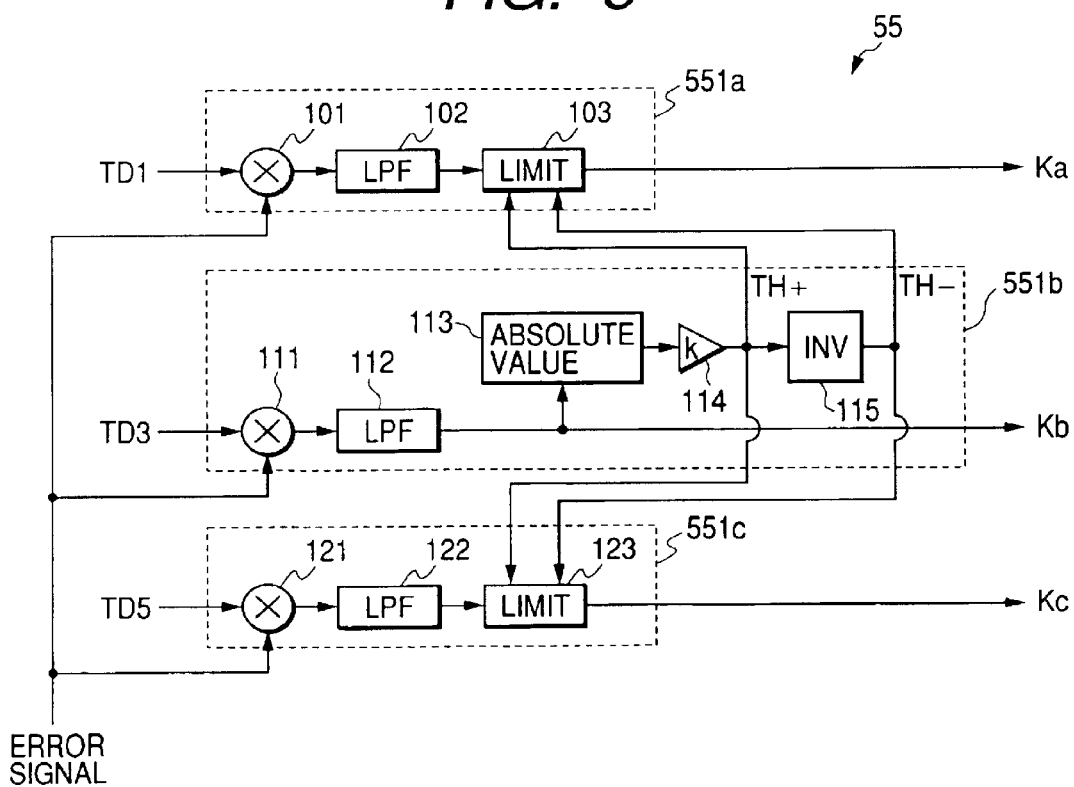
FIG. 6 is a block diagram of a coefficient updating device in FIG. 4.

As shown in FIG. 6, the coefficient updating device 55 has first, second, and third sections 551a, 551b, and 551c for generating signals representative of the tap coefficients Ka, Kb, and Kc respectively. The first section 551a includes a multiplier 101, a low pass filter 102, and a limiter 103. The second section 551b includes a multiplier 111, a low pass filter 112, an absolute value calculator 113, a multiplier 114, and an inverter 115. The third section 551c includes a multiplier 121, a low pass filter 122, and a limiter 123.

The multiplier 101 in the first section 551a receives the tap output signal TD1 and the equalization error signal. The multiplier 101 executes multiplication between the tap output signal TD1 and the equalization error signal, and outputs the multiplication-resultant signal to the low pass filter 102. The low pass filter 102 removes high-frequency components from the output signal of the multiplier 101, and outputs the resultant signal to the limiter 103. The limiter 103 receives signals from the second section 551b which represent positive and negative reference values TH+ and TH− equal in absolute value. As will be explained later, the reference values TH+ and TH− depend on the tap coefficient Kb.

The device 103 limits the value of the output signal of the low pass filter 102 to within the range between the reference values TH+ and TH−, and thereby processes the output signal of the low pass filter 102 into a signal representative of the tap coefficient Ka. The limiter 103 outputs the signal representative of the tap coefficient Ka.

The multiplier 121 in the third section 551c receives the tap output signal TD5 and the equalization error signal. The multiplier 121 executes multiplication between the tap output signal TD5 and the equalization error signal, and outputs the multiplication-resultant signal to the low pass filter 122. The low pass filter 122 removes high-frequency components from the output signal of the multiplier 121, and outputs the resultant signal to the limiter 123. The limiter 123 receives the signals from the second section 551b which represent the reference values TH+ and TH−. The device 123 limits the value of the output signal of the low pass filter 122 to within the range between the reference values TH+ and TH−, and thereby processes the output signal of the low pass filter 122 into a signal representative of the tap coefficient Kc. The limiter 123 outputs the signal representative of the tap coefficient Kc.

The multiplier 111 in the second section 551b receives the tap output signal TD3 and the equalization error signal. The multiplier 111 executes multiplication between the tap output signal TD3 and the equalization error signal, and outputs the multiplication-resultant signal to the low pass filter 112. The low pass filter 112 removes high-frequency components from the output signal of the multiplier 111, and thereby processes the output signal of the multiplier 111 into a signal representative of the tap coefficient Kb. The low pass filter 112 outputs the signal representative of the tap coefficient Kb. The absolute value calculator 113 receives the signal representative of the tap coefficient Kb. The device 113 calculates the absolute value of the tap coefficient Kb. The absolute value calculator 113 outputs a signal representative of the calculated absolute value to the multiplier 114. The device 114 multiplies the absolute value by a predetermined constant "k" equal to, for example, ½. The multiplier 114 outputs the multiplication-resultant signal to the limiters 103 and 123 in the first and third sections 551a and 551c as the signal representative of the positive reference value TH+. In addition, the multiplier 114 outputs the multiplication-resultant signal to the inverter 115. The device 115 inverts the output signal of the multiplier 114 in polarity. The inverter 115 outputs the inversion-resultant signal to the limiters 103 and 123 in the first and third sections 551a and 551c as the signal representative of the negative reference value TH−.

As understood from the previous description, the devices 103 and 123 limit the end-sample-corresponding tap coefficients Ka and Kc in response to the center-sample-corresponding tap coefficient Kb. The limiters 103 and 123 prevent the occurrence of wrong convergence conditions where the center-sample-corresponding tap coefficient Kb which should be the greatest is smaller than the end-sample-corresponding tap coefficients Ka and Kc. In addition, it is possible to avoid the occurrence of wrong conditions where one among the tap coefficients Ka, Kb, and Kc which should not be the greatest is dominant concerning the coefficient determination.

The adaptive equalization circuit 5 may be modified to include a transversal filter having taps, the number of which differs from five. Only signals appearing at alternate ones (odd-numbered ones or even-numbered ones) of the taps are used to generate an equalization-resultant signal.

The coefficient updating device 55 may be modified to control the polarities of the tap coefficients Ka and Kc in response to the tap coefficient Kb.

Second Embodiment

A second embodiment of this invention is similar to the first embodiment thereof except that an adaptive equalization circuit 5B replaces the adaptive equalization circuit 5 (see FIGS. 3 and 4).

Figure 7:
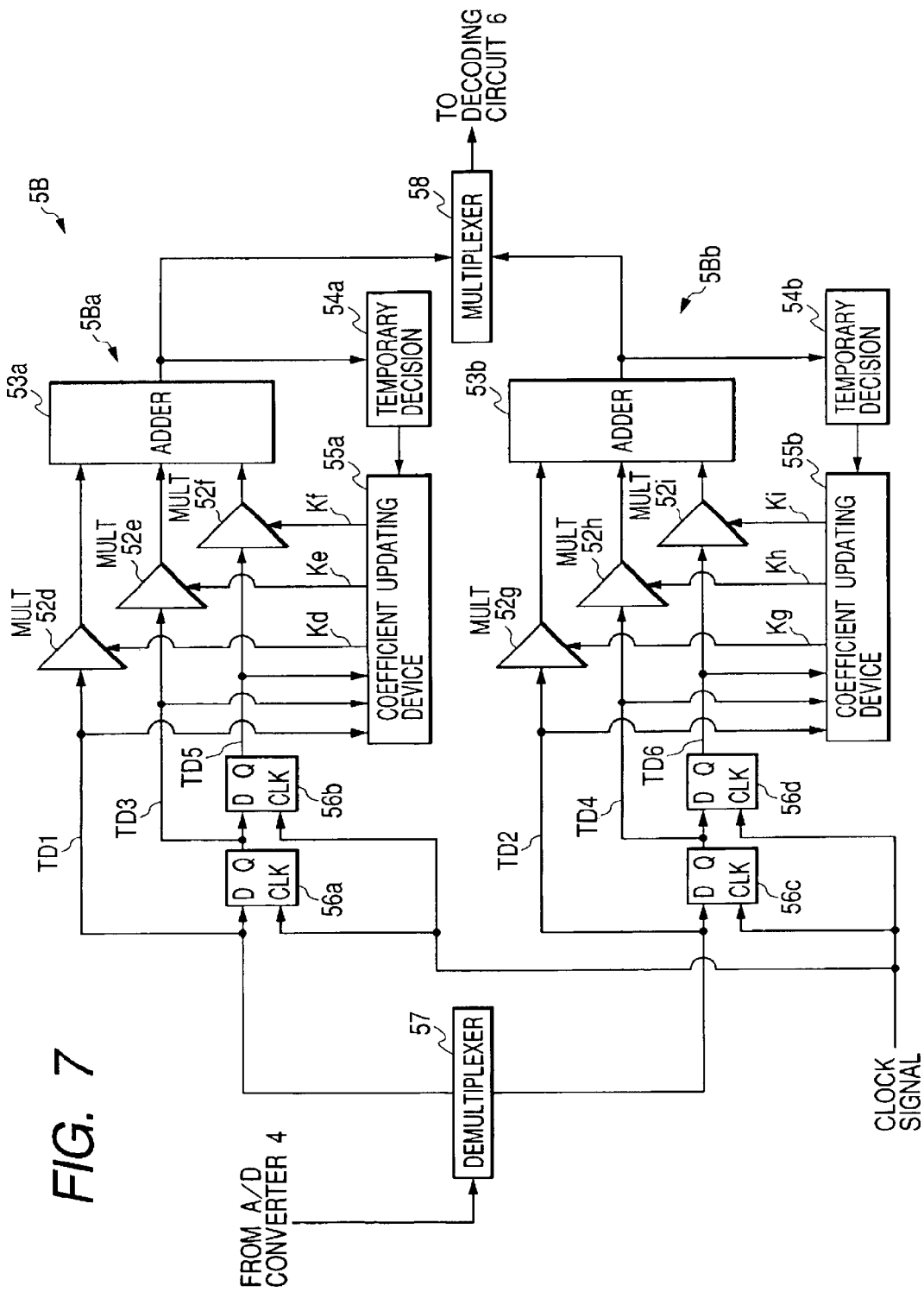
FIG. 7 is a block diagram of an adaptive equalization circuit in a second embodiment of this invention.

As shown in FIG. 7, the adaptive equalization circuit 5B includes a demultiplexer 57, a multiplexer 58, and first and second filter sections 5Ba and 5Bb connected between the demultiplexer and the multiplexer 58. The first filter section 5Ba has D-FFs 56a and 56b, multipliers 52d, 52e, and 52f, an adder 53a, a temporary decision device (a provisional determination device) 54a, and a coefficient updating device 55a. The second filter section 5Bb has D-FFs 56c and 56d, multipliers 52g, 52h, and 52i, an adder 53b, a temporary decision device 54b, and a coefficient updating device 55b.

The demultiplexer 57 receives the output signal of the A/D converter 4, that is, a sequence of digital samples (signal samples). Alternatively, the demultiplexer 57 may receive a signal resulting from re-sampling the output signal of the A/D converter 4 on an interpolation basis. The demultiplexer 57 responds to the system clock signal or the bit clock signal, and separates the output signal of the A/D converter 4 into a stream of first alternate signal samples (odd-numbered signal samples) and a stream of second alternate signal samples (even-numbered signal samples). The demultiplexer outputs the stream of odd-numbered signal samples to the first filter section 5Ba. The demultiplexer 57 outputs the stream of even-numbered signal samples to the second filter section 5Bb. In the first filter section 5Ba, the D-FFs 56a and 56b, the multipliers 52d, 52e, and 52f, and the adder 53a are connected to form a transversal filter. Specifically, the D-FFs 56a and 56b are connected in cascade or series in that order to compose a multiple-tap delay line in the transversal filter. The input terminal of the D-FF 56a is subjected to the stream of odd-numbered signal samples which is referred to as the odd-sample signal. The clock terminals of the D-FFs 56a and 56b receive a sub clock signal from a suitable device. The D-FFs 56a and 56b are driven by the sub clock signal. The sub clock signal has a frequency equal to half the frequency of the system clock signal. The odd-sample signal propagates successively through the D-FFs 56a and 56b while being delayed thereby. Each of the D-FFs 56a and 56b provides a predetermined signal delay corresponding to a period of the sub clock signal, that is, a 2-sample interval or a 2-bit-corresponding interval. The odd-sample signal which is applied to the input terminal of the D-FF 56a is used as a tap output signal TD1. Thus, the tap output signal TD1 is a non-delayed signal. A signal which appears at the tap (junction) between the D-FFs 56a and 56b is used as a tap output signal TD3.

The tap output signal TD3 is delayed from the tap output signal TD1 by a 2-sample interval or a 2-bit-corresponding interval. A signal which appears at the output terminal of the D-FF 56b is used as a tap output signal TD5. The tap output signal TD5 is delayed from the tap output signal TD3 by a 2-sample interval or a 2-bit-corresponding interval.

The tap output signal TD1 is fed to the multiplier 52d and the coefficient updating device 55a. The tap output signal TD3 is fed to the multiplier 52e and the coefficient updating device 55a. The tap output signal TD5 is fed to the multiplier 52f and the coefficient updating device 55a. The multiplier 52d receives an output signal of the coefficient updating device 55a which represents a tap coefficient Kd. The multiplier 52e receives an output signal of the coefficient updating device 55a which represents a tap coefficient Ke. The multiplier 52f receives an output signal of the coefficient updating device 55a which represents a tap coefficient Kf. The tap coefficients Kd, Ke, and Kf correspond to waveform equalization coefficients. The device 52d multiplies the tap output signal TD1 and the tap coefficient Kd, and outputs the multiplication-resultant signal to the adder 53a. The device 52e multiplies the tap output signal TD3 and the tap coefficient Ke, and outputs the multiplication-resultant signal to the adder 53a. The device 52f multiplies the tap output signal TD5 and the tap coefficient Kf, and outputs the multiplication-resultant signal to the adder 53a. The device 53a adds up the output signals of the multipliers 52d, 52e, and 52f into a first equalization-resultant signal which is referred to as an odd-sample equalization-resultant signal. The adder 53a outputs the odd-sample equalization-resultant signal to the temporary decision device 54a and the multiplexer 58.

The temporary decision device 54a is similar to the temporary decision device 54 (see FIG. 4). The temporary decision device 54a includes a logic circuit which is designed to implement a temporary decision about the odd-sample equalization-resultant signal (the output signal of the adder 53a) according to a predetermined algorithm. The temporary decision device 54a may include a programmable signal processor. In this case, the predetermined algorithm is given as a program for controlling the signal processor.

The temporary decision device 54a generates a target signal value for the odd-sample equalization-resultant signal in accordance with the result of the temporary decision. The temporary decision device 54a includes a subtracter which calculates the difference (error) between the target signal value and the actual value of the odd-sample equalization-resultant signal. The subtracter outputs a signal representative of the calculated difference to the coefficient updating device 55a as a first equalization error signal (a first amplitude error signal) which is referred to as an odd-sample equalization error signal.

The coefficient updating device 55a is similar to the coefficient updating device 55 (see FIGS. 4 and 6). The coefficient updating device 55a generates a tap coefficient Kd in response to the tap output signal TD1 and the odd-sample equalization error signal. The coefficient updating device 55a outputs a signal representative of the generated tap coefficient Kd to the multiplier 52d. The coefficient updating device 55a generates a tap coefficient Ke in response to the tap output signal TD3 and the odd-sample equalization error signal. The coefficient updating device 55a outputs a signal representative of the generated tap coefficient Ke to the multiplier 52e. The coefficient updating device 55a generates a tap coefficient Kf in response to the tap output signal TD5 and the odd-sample equalization error signal. The coefficient updating device 55a outputs a signal representative of the generated tap coefficient Kf to the multiplier 52f. The generated tap coefficients Kd, Ke, and Kf are updated for every odd-numbered signal sample. Preferably, the updating of the tap coefficients Kd, Ke, and Kf in response to the odd-sample equalization error signal is based on a feedback LMS (least-mean-square) adaptive algorithm designed to minimize the odd-sample equalization error signal.

In the second filter section 5Bb, the D-FFs 56c and 56d, the multipliers 52g, 52h, and 52i, and the adder 53b are connected to form a transversal filter. Specifically, the D-FFs 56c and 56d are connected in cascade or series in that order to compose a multiple-tape delay line in the transversal filter. The input terminal of the D-FF 56c is subjected to the stream of even-numbered signal samples which is referred to as the even-sample signal. The clock terminals of the D-FFs 56c and 56d receive the sub clock signal. The D-FFs 56c and 56d are driven by the sub clock signal. The even-sample signal propagates successively through the D-FFs 56c and 56d while being delayed thereby. Each of the D-FFs 56c and 56d provides a predetermined signal delay corresponding to a period of the sub clock signal, that is, a 2-sample interval or a 2-bit-corresponding interval. The even-sample signal which is applied to the input terminal of the D-FF 56c is used as a tap output signal TD2. Thus, the tap output signal TD2 is a non-delayed signal. A signal which appears at the tap (junction) between the D-FFs 56c and 56d is used as a tap output signal TD4. The tap output signal TD4 is delayed from the tap output signal TD2 by a 2-sample interval or a 2-bit-corresponding interval. A signal which appears at the output terminal of the D-FF 56d is used as a tap output signal TD6. The tap output signal TD6 is delayed from the tap output signal TD4 by a 2-sample interval or a 2-bit-corresponding interval.

The tap output signal TD2 is fed to the multiplier 52g and the coefficient updating device 55b. The tap output signal TD4 is fed to the multiplier 52h and the coefficient updating device 55b. The tap output signal TD6 is fed to the multiplier 52i and the coefficient updating device 55b. The multiplier 52g receives an output signal of the coefficient updating device 55b which represents a tap coefficient Kg. The multiplier 52h receives an output signal of the coefficient updating device 55b which represents a tap coefficient Kh. The multiplier 52i receives an output signal of the coefficient updating device 55b which represents a tap coefficient Ki. The tap coefficients Kg, Kh, and Ki correspond to waveform equalization coefficients. The device 52g multiplies the tap output signal TD2 and the tap coefficient Kg, and outputs the multiplication-resultant signal to the adder 53b. The device 52h multiplies the tap output signal TD4 and the tap coefficient Kh, and outputs the multiplication-resultant signal to the adder 53b. The device 52i multiplies the tap output signal TD6 and the tap coefficient Ki, and outputs the multiplication-resultant signal to the adder 53b. The device 53b adds up the output signals of the multipliers 52g, 52h, and 52i into a second equalization-resultant signal which is referred to as an even-sample equalization-resultant signal. The adder 53b outputs the even-sample equalization-resultant signal to the temporary decision device 54b and the multiplexer 58.

The temporary decision device 54b is similar to the temporary decision device 54 (see FIG. 4). The temporary decision device 54b includes a logic circuit which is designed to implement a temporary decision about the even-sample equalization-resultant signal (the output signal of the adder 53b) according to a predetermined algorithm. The temporary decision device 54b may include a programmable signal processor. In this case, the predetermined algorithm is given as a program for controlling the signal processor. The temporary decision device 54b generates a target signal value for the even-sample equalization-resultant signal in accordance with the result of the temporary decision. The temporary decision device 54b includes a subtracter which calculates the difference (error) between the target signal value and the actual value of the even-sample equalization-resultant signal. The subtracter outputs a signal representative of the calculated difference to the coefficient updating device 55b as a second equalization error signal (a second amplitude error signal) which is referred to as an even-sample equalization error signal.

The coefficient updating device 55b is similar to the coefficient updating device 55 (see FIGS. 4 and 6). The coefficient updating device 55b generates a tap coefficient Kg in response to the tap output signal TD2 and the even-sample equalization error signal. The coefficient updating device 55b outputs a signal representative of the generated tap. coefficient Kg to the multiplier 52g. The coefficient updating device 55b generates a tap coefficient Kh in response to the tap output signal TD4 and the even-sample equalization error signal. The coefficient updating device 55b outputs a signal representative of the generated tap coefficient Kh to the multiplier 52h. The coefficient updating device 55b generates a tap coefficient Ki in response to the tap output signal TD6 and the even-sample equalization error signal. The coefficient updating device 55b outputs a signal representative of the generated tap coefficient Ki to the multiplier 52i. The generated tap coefficients Kg, Kh, and Ki are updated for every even-numbered signal sample. Preferably, the updating of the tap coefficients Kg, Kh, and Ki in response to the even-sample equalization error signal is based on a feedback LMS (least-mean-square) adaptive algorithm designed to minimize the even-sample equalization error signal.

The multiplexer 58 receives the odd-sample equalization-resultant signal from the adder 53a. The multiplexer 58 receives the even-sample equalization-resultant signal from the adder 53b. The multiplexer 58 responds to the system clock signal (the bit clock signal), and combines the odd-sample equalization-resultant signal and the even-sample equalization-resultant signal into a third equalization-resultant signal which is referred to as a final equalization-resultant signal. Specifically, odd-numbered signal samples represented by the output signal of the adder 53a are located at first alternate ones of successive sample places in the final equalization-resultant signal while even-numbered signal samples are located at second alternate ones thereof. Thus, the multiplexer 58 alternately selects one among the odd-sample equalization-resultant signal and the even-sample equalization-resultant signal at a 2-sample-corresponding period to generate the final equalization-resultant signal. The multiplexer 58 outputs the final equalization-resultant signal to the decoding circuit 6.

As previously mentioned, the coefficient updating device 55a is similar to the coefficient updating device 55 (see FIGS. 4 and 6). Thus, the end-sample-corresponding tap coefficients Kd and Kf are limited in response to the center-sample-corresponding tap coefficient Ke. As previously mentioned, the coefficient updating device 55b is similar to the coefficient updating device 55 (see FIGS. 4 and 6). Thus, the end-sample-corresponding tap coefficients Kg and Ki are limited in response to the center-sample-corresponding tap coefficient Kh.

Each of the first and second filter sections 5Ba and 5Bb in the adaptive equalization circuit 5B may be modified to include a transversal filter having taps, the number of which differs from three.

Third Embodiment

Figure 8:
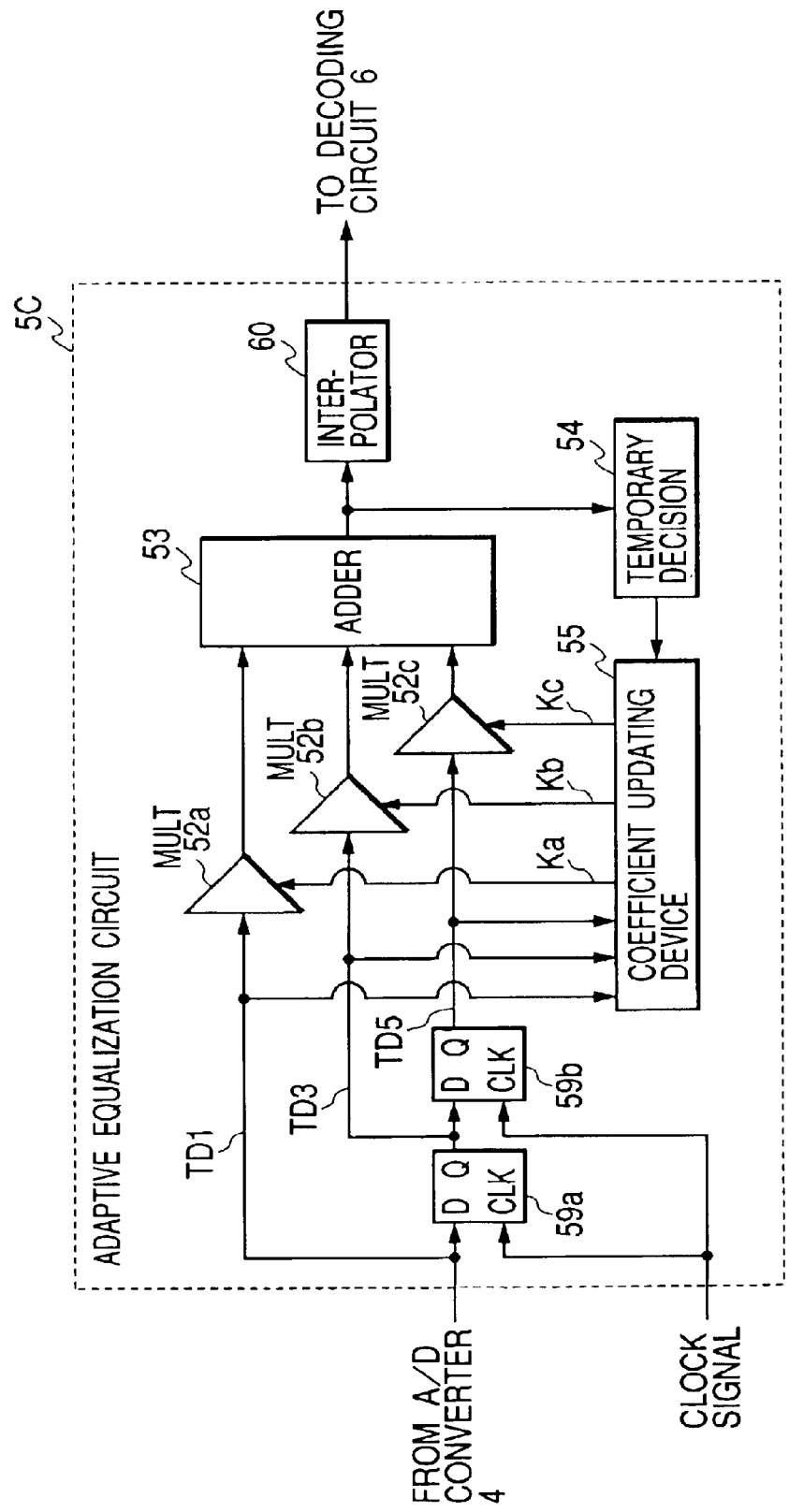
FIG. 8 is a block diagram of an adaptive equalization circuit in a third embodiment of this invention.

A third embodiment of this invention is similar to the first embodiment thereof except that an adaptive equalization circuit 5C replaces the adaptive equalization circuit 5 (see FIGS. 3 and 4). As shown in FIG. 8, the adaptive equalization circuit 5C includes D-FFs 59a and 59b, multipliers 52a, 52b, and 52c, an adder 53, a temporary decision device (a provisional determination device) 54, a coefficient updating device 55, and an interpolator 60.

The D-FFs 59a and 59b, the multipliers 52a, 52b, and 52c, and the adder 53 are connected to form a transversal filter. Specifically, the D-FFs 59a and 59b are connected in cascade or series in that order to compose a multiple-tape delay line in the transversal filter. The input terminal of the D-FF 59a is subjected to the output signal of the A/D converter 4. Alternatively, the input terminal of the D-FF 59a may be subjected to a signal resulting from re-sampling the output signal of the A/D converter 4 on an interpolation basis. The clock terminals of the D-FFs 59a and 56b receive a sub clock signal from a suitable device. The D-FFs 59a and 59b are driven by the sub clock signal. The sub clock signal has a frequency equal to half the frequency of the system clock signal.

The output signal of the A/D converter 4 propagates successively through the D-FFs 59a and 59b while being delayed thereby. Each of the D-FFs 59a and 59b provides a predetermined signal delay corresponding to a period of the sub clock signal, that is, a 2-sample interval or a 2-bit-corresponding interval. The output signal of the A/D converter 4 which is applied to the input terminal of the D-FF 59a is used as a tap output signal TD1. Thus, the tap output signal TD1 is a non-delayed signal. A signal which appears at the tap (junction) between the D-FFs 59a and 59b is used as a tap output signal TD3. The tap output signal TD3 is delayed from the tap output signal TD1 by a 2-sample interval or a 2-bit-corresponding interval. A signal which appears at the output terminal of the D-FF 59b is used as a tap output signal TD5. The tap output signal TD5 is delayed from the tap output signal TD3 by a 2-sample interval or a 2-bit-corresponding interval.

The tap output signal TD1 is fed to the multiplier 52a and the coefficient updating device 55. The tap output signal TD3 is fed to the multiplier 52b and the coefficient updating device 55. The tap output signal TD5 is fed to the multiplier 52c and the coefficient updating device 55. The multiplier 52a receives an output signal of the coefficient updating device 55 which represents a tap coefficient Ka. The multiplier 52b receives an output signal of the coefficient updating device 55 which represents a tap coefficient Kb. The multiplier 52c receives an output signal of the coefficient updating device 55 which represents a tap coefficient Kc. The device 52a multiplies the tap output signal TD1 and the tap coefficient Ka, and outputs the multiplication-resultant signal to the adder 53. The device 52b multiplies the tap output signal TD3 and the tap coefficient Kb, and outputs the multiplication-resultant signal to the adder 53. The device 52c multiplies the tap output signal TD5 and the tap coefficient Kc, and outputs the multiplication-resultant signal to the adder 53. The device 53 adds up the output signals of the multipliers 52a, 52b, and 52c into a primary equalization-resultant signal. The adder 53 outputs the primary equalization-resultant signal to the temporary decision device 54 and the interpolator 60.

The temporary decision device 54 is similar to that in FIG. 4. The temporary decision device 54 includes a logic circuit which is designed to implement a temporary decision about the primary equalization-resultant signal (the output signal of the adder 53) according to a predetermined algorithm. The temporary decision device 54 may include a programmable signal processor. In this case, the predetermined algorithm is given as a program for controlling the signal processor. The temporary decision device 54 generates a target signal value for the primary equalization-resultant signal in accordance with the result of the temporary decision. The temporary decision device 54 includes a subtracter which calculates the difference (error) between the target signal value and the actual value of the primary equalization-resultant signal. The subtracter outputs a signal representative of the calculated difference to the coefficient updating device 55 as an equalization error signal (an amplitude error signal).

The coefficient updating device 55 is similar to that in FIGS. 4 and 6. The coefficient updating device 55 generates a tap coefficient Ka in response to the tap output signal TD1 and the equalization error signal. The coefficient updating device 55 outputs a signal representative of the generated tap coefficient Ka to the multiplier 52a. The coefficient updating device 55 generates a tap coefficient Kb in response to the tap output signal TD3 and the equalization error signal. The coefficient updating device 55 outputs a signal representative of the generated tap coefficient Kb to the multiplier 52b. The coefficient updating device 55 generates a tap coefficient Kc in response to the tap output signal TD5 and the equalization error signal. The coefficient updating device 55 outputs a signal representative of the generated tap coefficient Kc to the multiplier 52c. The generated tap coefficients Ka, Kb, and Kc are updated for each of alternate ones of signal samples. Preferably, the updating of the tap coefficients Ka, Kb, and Kc in response to the equalization error signal is based on a feedback LMS (least-mean-square) adaptive algorithm designed to minimize the equalization error signal.

The interpolator 60 receives the primary equalization-resultant signal from the adder 53. The device 60 implements interpolation responsive to the primary equalization-resultant signal, thereby generating signal samples between signal samples represented by the primary equalization-resultant signal. The interpolator 60 combines the generated signal samples and the signal samples represented by the primary equalization-resultant signal into a final equalization-resultant signal. The interpolator 60 outputs the final equalization-resultant signal to the decoding circuit 6.

As previously mentioned, the coefficient updating device 55 is similar to that in FIGS. 4 and 6. Thus, the end-sample-corresponding tap coefficients Ka and Kc are limited in response to the center-sample-corresponding tap coefficient Kb.

The adaptive equalization circuit 5C may be modified to include a transversal filter having taps, the number of which differs from three.

Fourth Embodiment

Figure 9:
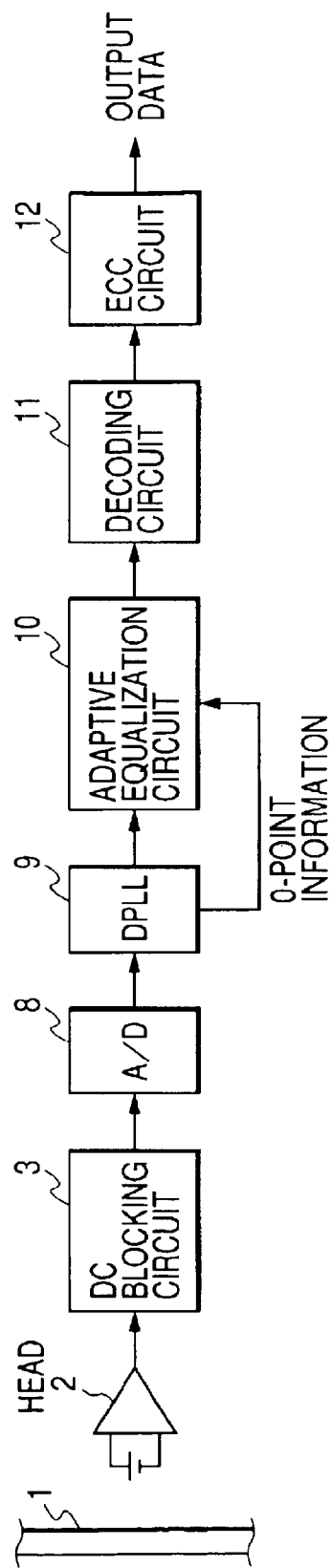
FIG. 9 is a block diagram of an information reproducing apparatus according to a fourth embodiment of this invention.

FIG. 9 shows an information reproducing apparatus according to a fourth embodiment of this invention. With reference to FIG. 9, an optical disc 1 stores a signal of a run-length-limited code at a predetermined high recording density. An optical head 2 reads out the signal of the run-length-limited code from the optical disc 1. The optical head 2 includes a photoelectric converter (a photodetector), and an amplifier following the photoelectric converter. The optical head 2 outputs the read-out signal to a direct-current blocking circuit (a DC blocking circuit) 3. The circuit 3 blocks a direct-current component (a DC component) of the read-out signal, and passes only alternating-current components (AC components) thereof. The output signal of the DC blocking circuit 3 is applied to an A/D (analog-to-digital) converter 8. The optical disc 1, the optical head 2, and the DC block circuit 3 are similar to those in FIG. 3.

The A/D converter 8 changes the output signal of the DC blocking circuit 3 into a corresponding digital signal. Specifically, the A/D converter 8 periodically samples the output signal of the DC blocking circuit 3 in response to a fixed-frequency clock signal, and converts every resultant sample into a digital sample. The A/D converter 8 outputs the digital signal, that is, a sequence of the digital samples, to a re-sampling DPLL section (re-sampling digital PLL section) 9. The output signal of the A/D converter 8 is referred to as a first digital signal. The position of the A/D converter 8 may be between the optical head 2 and the DC blocking circuit 3.

A digital AGC (automatic gain control) circuit may be provided between the A/D converter 8 and the re-sampling DPLL section 9. In this case, the AGC circuit subjects the output signal of the A/D converter 8 to automatic gain control for providing a constant signal amplitude on a digital basis. The AGC circuit outputs the resultant digital signal to the re-sampling DPLL section 9.

The re-sampling DPLL section 9 converts the output signal (the first digital signal) of the A/D converter 8 into a second digital signal. Timings related to samples of the output signal (the first digital signal) of the A/D converter 8 are determined by the fixed-frequency clock signal. Timings related to samples of the second digital signal are determined by a bit clock signal synchronized with the fixed-frequency clock signal. The timings related to samples of the second digital signal differ from those related to samples of the first digital signal by a phase of, for example, 180°. The re-sampling DPLL section 9 generates samples of the second digital signal from samples of the first digital signal through at least one of interpolation and decimation.

The re-sampling DPLL section 9 includes a digital PLL (phase locked loop) circuit having a closed loop. The digital PLL circuit in the re-sampling DPLL section 9 generates a second digital signal on the basis of the output signal of the A/D converter 8. The second digital signal relates to a sampling frequency equal to a bit clock frequency. Specifically, samples of the second digital signal are generated from samples of the output signal of the A/D converter 8 through a PLL re-sampling process based on at least one of interpolation and decimation. The re-sampling DPLL section 9 outputs the second digital signal to an adaptive equalization circuit 10. The second digital signal is also referred to as the main digital signal or the main output signal of the re-sampling DPLL section 9.

The re-sampling DPLL section 9 includes a zero-cross detector which senses every point (every zero-cross point) at which the first digital signal (or 0°-phase-point data samples mentioned later) crosses a zero level. The zero-cross detector generates 0-point information representative of every sensed point. Specifically, the zero-cross detector decides whether or not every sample of the first digital signal (or the re-sampling-resultant signal) corresponds to a zero-cross point. The zero-cross detector generates 0-point information in response to the result of the decision. In the re-sampling DPLL section 9, the timing of the re-sampling or the frequency and phase of the re-sampling are locked so that the levels represented by zero-cross-point-corresponding samples of the second digital signal will be equal to "0". The re-sampling DPLL section 9 outputs the 0-point information to the adaptive equalization circuit 10 as the sub output signal.

Figure 10:
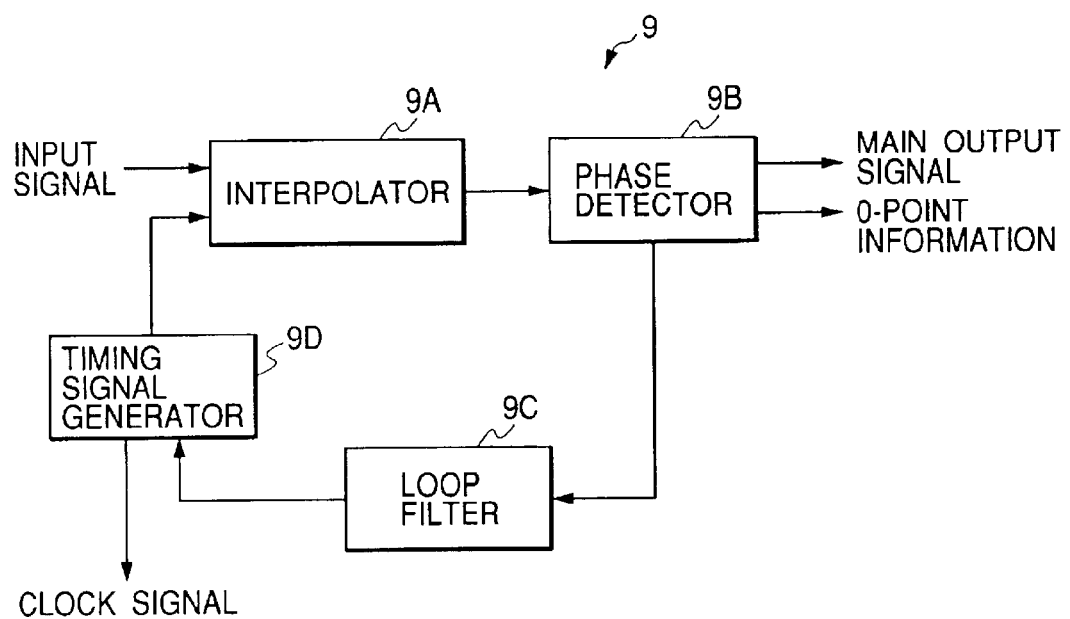
FIG. 10 is a block diagram of a re-sampling DPLL section in FIG. 9.

As shown in FIG. 10, the re-sampling DPLL section 9 includes an interpolator 9A, a phase detector 9B, a loop filter 9C, and a timing signal generator 9D which are connected in a closed loop in that order. The interpolator 9A receives the output signal of the A/D converter 8. The interpolator 9A receives data point phase information and the bit clock signal from the timing signal generator 9D. The interpolator 9A estimates 0°-phase-point data samples from samples of the output signal of the A/D converter 8 through interpolation responsive to the data point phase information and the bit clock signal. Here, "phase" is defined relative to the bit clock signal. The interpolator 9A outputs the estimated 0°-phase-point data samples to the phase detector 9B.

In the re-sampling DPLL section 9, the phase detector 9B generates 180°-phase-point data samples from the 0°-phase-point data samples. Specifically, the phase detector 9B calculates a mean of a current 0°-phase-point data sample and an immediately preceding 0°-phase-point data sample, and uses the calculated mean as a current 180°-phase-point data sample. The phase detector 9B outputs the 180°-phase-point data samples to the adaptive equalization circuit 10 as the second digital signal (the main output signal). In addition, the phase detector 9B senses zero-cross points from the 0°-phase-point data samples. Furthermore, the phase detector 9B detects a phase error in response to each of the sensed zero-cross points. Specifically, the phase detector 9B senses a zero-cross point by referring to a current 0°-phase-point data sample and an immediately preceding 0°-phase-point data sample. When a zero-cross point is sensed, the phase detector 9B multiplies the polarity of the immediately preceding 0°-phase-point data sample by a mean of the current 0°-phase-point data sample and the immediately preceding 0°-phase-point data sample. The phase detector 9B uses the multiplication result as a phase error. The phase detector 9B generates 0-point information representing the sensed zero-cross points. The phase detector 9B outputs the 0-point information (the sub output signal) to the adaptive equalization circuit 10. The phase detector 9B generates a signal representing the phase error. The phase detector 9B outputs the phase error signal to the loop filter 9C. The loop filter 9C integrates the phase error signal. The loop filter 9C outputs the integration-resultant signal to the timing signal generator 9D. The timing signal generator 9D produces the data point phase information and the bit clock signal in response to the output signal of the loop filter 9C. The timing signal generator 9D outputs the data point phase information and the bit clock signal to the interpolator 9A. In addition, the timing signal generator 9D outputs the bit clock signal to the adaptive equalization circuit 10.

The adaptive equalization circuit 10 subjects the main output signal of the re-sampling DPLL section 9 to automatic waveform equalization which corresponds to a process of providing the signal in question with a partial-response (PR) characteristic. The adaptive equalization circuit 10 includes D-FFs acting as 1-sample delay elements or latches responsive to the bit clock signal outputted from the re-sampling DPLL section 9. The adaptive equalization circuit 10 outputs the equalization-resultant signal to a decoding circuit 11. The decoding circuit 11 recovers original data from the output signal of the adaptive equalization circuit 10 through a viterbi decoding procedure. The decoding circuit 11 is similar to the decoding circuit 6 in FIG. 3. The decoding circuit 11 outputs the recovered data to an ECC (error checking and correcting) circuit 12. The ECC circuit 12 extracts an error correction code from the recovered data outputted by the decoding circuit 11. The ECC circuit 12 corrects errors in the recovered data in response to the error correction code. The ECC circuit 12 outputs the resultant recovered data.

FIG. 11 shows the details of the adaptive equalization circuit 10. The adaptive equalization circuit 10 is similar to the adaptive equalization circuit 5 (see FIG. 4) except that a temporary decision device (a provisional determination device) 54P replaces the temporary decision device 54, and a tap delay circuit 54Q is additionally provided.

The main output signal (the second digital signal) from the re-sampling DPLL section 9 is applied to the D-FF 51a in the adaptive equalization circuit 10. Also, the main output signal from the re-sampling DPLL section 9 is applied to the multiplier 52a in the adaptive equalization circuit 10 as the tap output signal TD1. The D-FFs 51a, 51b, 51c, and 51d in the adaptive equalization circuit 10 are driven by the bit clock signal fed from the re-sampling DPLL section 9. The adder 53 in the adaptive equalization circuit 10 outputs an equalization-resultant signal to the decoding circuit 11 and the temporary decision device 54P.

The tap delay circuit 54Q receives the 0-point information from the re-sampling DPLL section 9. The tap delay circuit 54Q defers or delays the 0-point information by a plurality of different time intervals, and thereby converts the 0-point information into different tap delayed signals. The tap delayed signals are temporally spaced samples of the 0-point information, respectively. The number of the tap delayed signals is three or more. The tap delay circuit 54Q outputs the tap delayed signals (the samples of the 0-point information) to the temporary decision circuit 54P. The temporary decision circuit 54P includes a logic circuit which is designed to implement a temporary decision about the equalization-resultant signal according to a predetermined algorithm responsive to the equalization-resultant signal, the tap delayed signals from the tap delay circuit 54Q, an RLL (run-length-limited) mode signal, and a PR (partial-response) mode signal. The temporary decision device 54P may include a programmable signal processor. In this case, the predetermined algorithm is given as a program for controlling the signal processor. The temporary decision device 54P generates a target signal value for the equalization-resultant signal in accordance with the result of the temporary decision. The temporary decision device 54P includes a subtracter which calculates the difference (error) between the target signal value and the actual value of the equalization-resultant signal. The subtracter outputs a signal representative of the calculated difference to the coefficient updating device 55 as an equalization error signal (an amplitude error signal).

The RLL mode signal represents one selected from predetermined RLL modes. Specifically, the RLL mode represented by the RLL mode signal agrees with the type of the run-length-limited code used by the signal recorded on the optical disc 1. The PR mode signal represents one selected from predetermined PR modes. The PR mode represented by the PR mode signal designates the type of the PR waveform equalization implemented by the adaptive equalization circuit 10.

The temporary decision device 54P and the tap delay circuit 54Q may be basically similar to those shown in European patent application EP 1014363 A2, the disclosure of which is hereby incorporated by reference.

The adaptive equalization circuit 10 may be replaced by a modification of the adaptive equalization circuit 5B in FIG. 7. According to the modification of the adaptive equalization circuit 5B, a first tap delay circuit defers or delays the 0-point information by a plurality of different time intervals, and thereby converts the 0-point information into first different tap delayed signals. In addition, a second tap delay circuit defers or delays the 0-point information by a plurality of different time intervals, and thereby converts the 0-point information into second different tap delayed signals. The first tap delay circuit outputs the first tap delayed signals to a temporary decision device 54a (see FIG. 7). The second tap delay circuit outputs the second tap delayed signals to a temporary decision device 54b (see FIG. 7). The temporary decision device 54a implements a temporary decision about the first equalization-resultant signal in response to the first equalization-resultant signal, the first tap delayed signals, the RLL mode signal, and the PR mode signal. The temporary decision device 54b implements a temporary decision about the second equalization-resultant signal in response to the second equalization-resultant signal, the second tap delayed signals, the RLL mode signal, and the PR mode signal.

The adaptive equalization circuit 10 may be replaced by a modification of the adaptive equalization circuit 5C in FIG. 8.

According to the modification of the adaptive equalization circuit 5C, a tap delay circuit defers or delays the 0-point information by a plurality of different time intervals, and thereby converts the 0-point information into different tap delayed signals. The tap delay circuit outputs the tap delayed signals to a temporary decision device 54 (see FIG. 8). The temporary decision device 54 implements a temporary decision about the primary equalization-resultant signal (the output signal of the adder 53) in response to the primary equalization-resultant signal, the tap delayed signals, the RLL mode signal, and the PR mode signal.

The 0-point information may be generated by a zero detector following the adder 53 (see FIG. 11). The generation of the 0-point information by the zero detector is responsive to the output signal of the adder 53. Such a zero detector is shown in European patent application EP 1014363 A2, the disclosure of which is hereby incorporated by reference.

What is claimed is:

1. A reproducing apparatus comprising:
means for reproducing a signal from a recording medium to get a reproduced signal;
means for sampling the reproduced signal in response to a clock signal to get a sampling-resultant signal;
a transversal filter including a delay line having taps and delaying the sampling-resultant signal, multipliers for multiplying only alternate ones among signals appearing at the taps by tap coefficients to get multiplication results, and an adder for adding the multiplication results into a filtering-resultant signal;
a temporary decision device for calculating a temporary decision value of the filtering-resultant signal according to a temporary decision procedure, for calculating a difference between the temporary decision value of the filtering-resultant signal and an actual value thereof, and for generating an error signal in response to the calculated difference; and
means for controlling the tap coefficients used in the transversal filter in response to the error signal and the reproduced signal to minimize the error signal.

2. A reproducing apparatus comprising:
means for reproducing a signal of a run-length-limited code from a recording medium to get a reproduced signal;
means for sampling the reproduced signal in response to a clock signal to get a sampling-resultant signal;
a transversal filter including a delay line having taps and delaying the sampling-resultant signal, multipliers for multiplying signals appearing at the taps by tap coefficients to get multiplication results, and an adder for adding the multiplication results into a filtering-resultant signal;
a temporary decision device for calculating a temporary decision value of the filtering-resultant signal according to a temporary decision procedure, for calculating a difference between the temporary decision value of the filtering-resultant signal and an actual value thereof, and for generating an error signal in response to the calculated difference;
means for controlling the tap coefficients used in the transversal filter in response to the error signal and the reproduced signal to minimize the error signal; and
means for controlling first ones among the tap coefficients in response to second one among the tap coefficients, the second one differing from the first ones.

3. A reproducing apparatus as recited in claim 1, further comprising:
means for detecting whether or not the sampling-resultant signal corresponds to a zero-cross point, and generating 0-point information in response to a result of said detecting;
a delay circuit responsive to the 0-point information for outputting temporally spaced samples of the 0-point information; and
means provided in the temporary decision device for calculating the temporary decision value of the filtering-resultant signal on the basis of a PR mode signal, an RLL mode signal, the samples of the 0-point information which are outputted from the delay circuit, and an actual value of the filtering-resultant signal, the PR mode signal representing a type of a partial-response waveform equalization corresponding to filtering by the transversal filter, the RLL mode signal representing a type of the run-length-limited code used by the reproduced signal.

4. A reproducing apparatus as recited in claim 2, further comprising:
means for detecting whether or not the sampling-resultant signal corresponds to a zero-cross point, and generating 0-point information in response to a result of said detecting;
a delay circuit responsive to the 0-point information for outputting temporally spaced samples of the 0-point information; and
means provided in the temporary decision device for calculating the temporary decision value of the filtering-resultant signal on the basis of a PR mode signal, an RLL mode signal, the samples of the 0-point information which are outputted from the delay circuit, and an actual value of the filtering-resultant signal, the PR mode signal representing a type of a partial-response waveform equalization corresponding to filtering by the transversal filter, the RLL mode signal representing a type of a run-length-limited code used by the reproduced signal.

5. A reproducing apparatus as recited in claim 3, wherein the 0-point-information generating means comprises a re-sampling DPLL circuit for re-sampling the sampling-resultant signal to get a re-sampling-resultant signal, for detecting whether or not the re-sampling-resultant signal corresponds to a zero-cross point, and for generating the 0-point information in response to a result of said detecting.

6. A reproducing apparatus comprising:
means for reproducing a signal from a recording medium to get a reproduced signal;
means for sampling the reproduced signal in response to a clock signal to get a sampling-resultant signal;
means for re-sampling the sampling-resultant signal on an interpolation basis to get a re-sampling-resultant signal;
means for separating one of (1) the sampling-resultant signal and (2) the re-sampling-resultant signal into an odd-sample signal composed of odd-numbered signal samples and an even-sample signal composed of even-numbered signal samples;
a first transversal filter including a first delay line having first taps and delaying the odd-sample signal, first multipliers for multiplying first tap signals appearing at the first taps by first tap coefficients to get first multiplication results, and a first adder for adding the first multiplication results into a first filtering-resultant signal;
a first temporary decision device for calculating a temporary decision value of the first filtering-resultant signal according to a temporary decision procedure, for calculating a first difference between the temporary decision value of the first filtering-resultant signal and an actual value thereof, and for generating a first error signal in response to the calculated first difference;
means for controlling the first tap coefficients in response to the first error signal and the first tap signals to minimize the first error signal;
means for controlling first ones among the first tap coefficients in response to second one among the first tap coefficients, the second one differing from the first ones;
a second transversal filter including a second delay line having second taps and delaying the even-sample signal, second multipliers for multiplying second tap signals appearing at the second taps by second tap coefficients to get second multiplication results, and a second adder for adding the second multiplication results into a second filtering-resultant signal;

a second temporary decision device for calculating a temporary decision value of the second filtering-resultant signal according to the temporary decision procedure, for calculating a second difference between the temporary decision value of the second filtering-resultant signal and an actual value thereof, and for generating a second error signal in response to the calculated second difference;

means for controlling the second tap coefficients in response to the second error signal and the second tap signals to minimize the second error signal;

means for controlling third ones among the second tap coefficients in response to fourth one among the second tap coefficients, the fourth one differing from the third ones; and means for combining the first filtering-resultant signal and the second filtering-resultant signal into a final filtering-resultant signal.

7. A reproducing apparatus comprising:

means for reproducing a signal from a recording disc to get a reproduced signal;

means for sampling the reproduced signal in response to a clock signal to get a sampling-resultant signal;

a transversal filter including a delay line having taps and delaying the sampling-resultant signal, multipliers for multiplying tap signals appearing at the taps by tap coefficients to get multiplication results, and an adder for adding the multiplication results into a filtering-resultant signal;

a temporary decision device for calculating a temporary decision value of the filtering-resultant signal according to a temporary decision procedure, for calculating a difference between the temporary decision value of the filtering-resultant signal and an actual value thereof, and for generating an error signal in response to the calculated difference;

means for controlling the tap coefficients used in the transversal filter in response to the error signal and the tap signals to minimize the error signal; and means for controlling first ones among the tap coefficients in response to second one among the tap coefficients, the second one differing from the first ones.

* * * * *